United States Patent [19]

Steger

[11] 4,245,798
[45] Jan. 20, 1981

[54] LOCKBAR RELEASE AND ANTI-REWIND FEATURE FOR SEAT BELT RETRACTOR

[75] Inventor: Charles B. Steger, Warren, Mich.

[73] Assignee: General Motors Corporation, Detroit, Mich.

[21] Appl. No.: 99,510

[22] Filed: Dec. 3, 1979

[51] Int. Cl.³ ........................ A62B 35/02; B65H 75/48
[52] U.S. Cl. .......................... 242/107.4 A; 242/107.6; 280/802
[58] Field of Search ................. 242/107.4 R–107.4 E, 242/107.6, 107.7; 280/801–808; 297/469, 475–480

[56] References Cited

U.S. PATENT DOCUMENTS

| | | | |
|---|---|---|---|
| 4,040,645 | 8/1977 | Giffen et al. | 242/107.4 A X |
| 4,090,735 | 5/1978 | Czernakowski | 242/107.4 A |
| 4,135,683 | 1/1979 | Stephenson et al. | 242/107.4 A |
| 4,181,326 | 1/1980 | Hollowell et al. | 242/107.4 A X |

Primary Examiner—John M. Jillions
Attorney, Agent, or Firm—Charles E. Leahy

[57] ABSTRACT

A seat belt retractor has a belt reel rotatably journaled on a housing. A ratchet plate carried by the reel has teeth facing in both the belt winding and unwinding directions. A lockbar is pivotally movable between a disengaged position allowing reel rotation and first and second ratchet engaging positions overcenter from one another with respect to the axis of reel rotation for engagement respectively with the unwinding facing and winding facing ratchet teeth. A support link supports the lockbar at the disengaged position for pivotal movement by an inertia sensor into engagement with the unwinding facing teeth to lock the reel against belt unwinding and thereby restrain the seated occupant. A handle permits reciprocal movement of the support link away from the ratchet plate to permit belt unwinding reel rotation which pivots the lockbar overcenter and establishes the lockbar for subsequent engagement with the belt winding facing teeth upon initiation of belt windup by the reel windup spring so that the belt is held at the extended length to facilitate occupant egress. Subsequent reciprocal movement of the support link by the handle permits belt winding reel rotation by the rewind spring to rewind the belt and return the lockbar overcenter to the normal position for subsequent pivotal movement by the inertia sensor.

3 Claims, 5 Drawing Figures

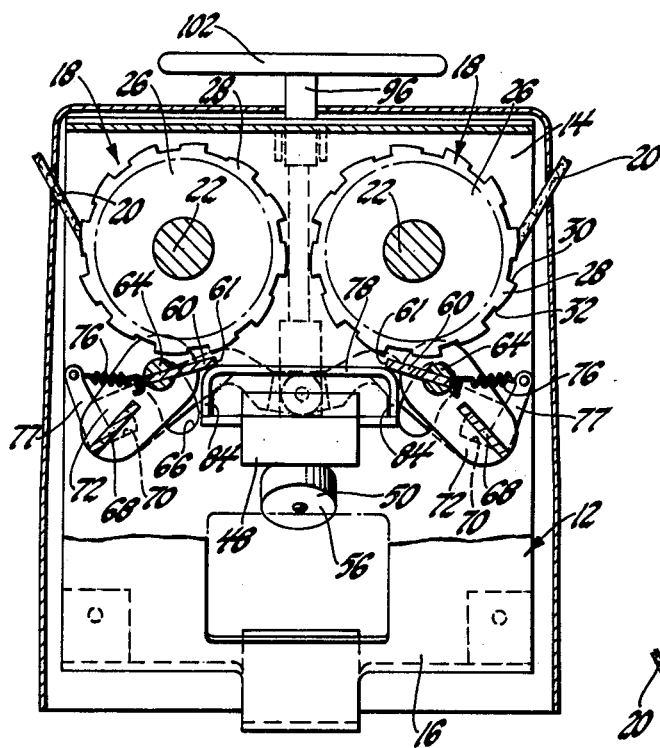
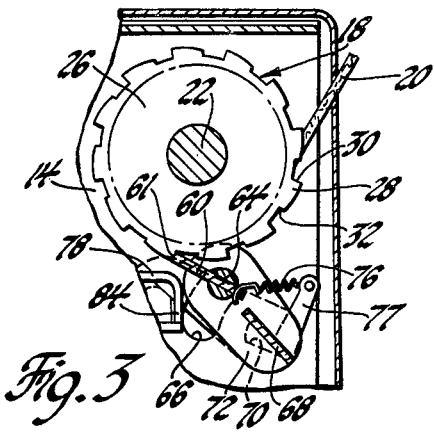
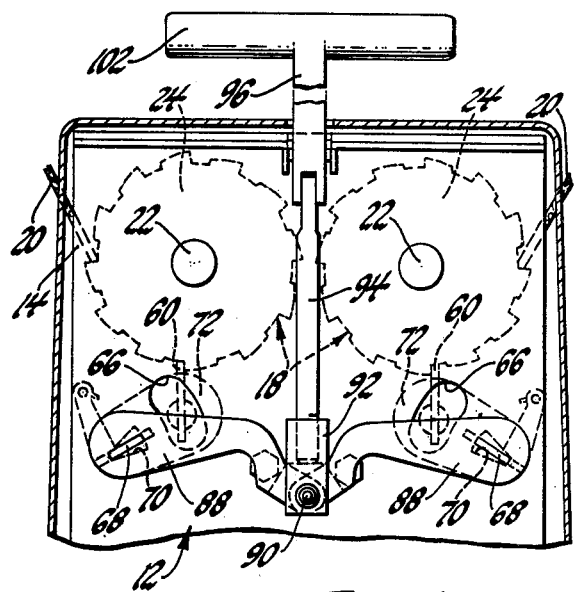
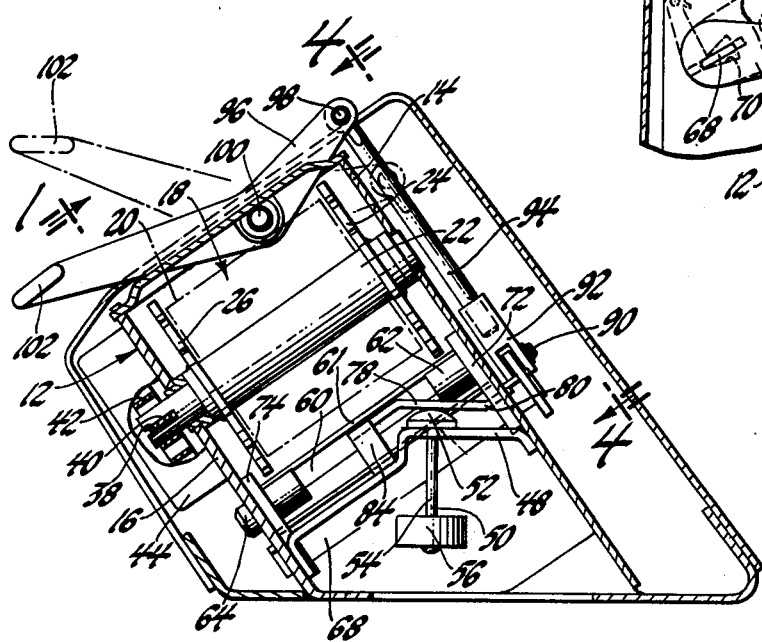
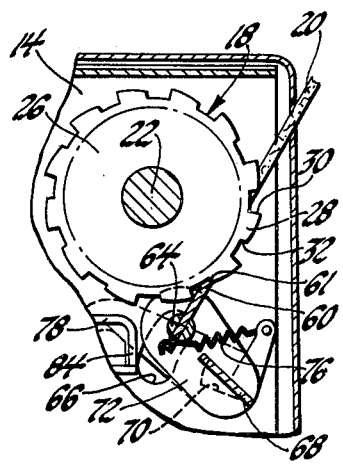

LOCKBAR RELEASE AND ANTI-REWIND FEATURE FOR SEAT BELT RETRACTOR

The invention relates to an inertia locking seat belt retractor and more particularly provides mechanism by which the lockbar may be manually disengaged from locking the reel against belt unwinding and then reengaged to lock the reel against belt rewinding to facilitate occupant egress.

BACKGROUND OF THE INVENTION

Vehicle occupant restraint retractors have heretofore been provided with an inertia sensitive pendulum or the like for moving a lockbar into engagement with a toothed ratchet plate attached to the belt reel so that the belt is locked against unwinding to restrain an occupant in the seat. It is characteristic of these retractors that the locking engagement between the lockbar and the ratchet plate teeth is effectively maintained as long as an occupant restraining load is imposed on the belt even though the inertia stimulus is terminated. When the load is removed from the belt, a slight belt rewinding rotation by the reel windup spring permits the lockbar to disengage from the ratchet plate.

It is known to use the foredescribed seat belt retractor in a seat belt system of the type having one end of the belt connected to the vehicle door so that the belt will be automatically unwound to an unrestraining position when the door is opened and rewound to the restraining position when the door is closed. It has been recognized as desirable to provide a handle or the like which is manually operable to forcibly disengage the lockbar from the ratchet plate so that the belt may be unwound from the reel to permit opening movement of the door. An example of seat belt retractors having such a lockbar release are the copending patent application Ser. No. 044,753 by Bernard J. Finn et al, filed June 1, 1979 and my copending patent application Ser. No. 093,937 filed Nov. 13, 1979.

SUMMARY OF THE INVENTION

The present invention provides an improvement in the aforedescribed lockbar release for seat belt retractors and more particularly permits the lockbar to go overcenter with respect to the axis of reel rotation for subsequent engagement by ratchet teeth facing in the winding direction of reel rotation to prevent a subsequent belt rewinding rotation which would rewind the belt to a taut condition about the occupant. Accordingly, the belt will remain extended from the retractor to facilitate occupant egress and eliminate the need for a subsequent manual actuation to disengage the lockbar.

According to the present invention the seat belt retractor has a belt reel journaled on a housing for belt winding and unwinding rotation about an axis of reel rotation. A ratchet plate carried by the reel has teeth facing in both the belt winding and unwinding directions. A lockbar is pivotally movable between a disengaged position allowing free belt winding and unwinding rotation and first and second ratchet engaging positions overcenter from one another with respect to the axis of reel rotation for engagement respectively with the unwinding facing and winding facing ratchet teeth. A support link supports the lockbar at the disengaged position for pivotal movement by an inertia sensing pendulum from the disengaged position into engagement with the unwinding facing teeth to lock the reel against belt unwinding and thereby restrain the occupant. An operator actuable handle permits limited reciprocal movement of the support link away from the ratchet plate to permit belt unwinding reel rotation which pivots the lockbar overcenter with respect to the axis of reel rotation and establish the lockbar for subsequent engagement with the belt winding facing teeth upon initiation of belt windup by the reel windup spring. Engagement of the lockbar with the ratchet teeth facing in the belt winding direction prevents the belt from being rewound to the restraining position so that occupant egress is facilitated. The operator actuable handle is subsequently operated to move these supports away from the ratchet plate thereby permitting the rewind spring to rewind the reel and in so doing return the lockbar overcenter to the normal position for subsequent pivotal movement by the inertia sensing pendulum.

Accordingly, the object, feature and advantage of this invention resides in the provision of reel ratchet teeth facing in both directions of reel rotation and a collapsible lockbar support permitting overcenter movement of the lockbar between belt unwinding preventing engagement of the ratchet teeth and belt rewind preventing engagement of the ratchet teeth.

BRIEF DESCRIPTION OF THE DRAWINGS

These and other features, objects and advantages of the invention become apparent upon consideration of the specification and the appended drawings in which:

FIG. 1 is an elevation view of a retractor embodying the invention and showing the lockbar in the normal position of disengagement to permit belt winding and unwinding;

FIG. 2 is a side elevation view of the retractor FIG. 1;

FIG. 3 is a partial fragmentary view similar to FIG. 1 but showing the lockbar in engagement with the ratchet plate to prevent belt unwinding;

FIG. 4 is a view taken in the direction of arrows 4—4 of FIG. 2 but showing the operator handle raised to permit overcenter movement of the lockbar between engaged positions respectively preventing belt unwinding and belt rewinding; and FIG. 5 is a partial fragmentary view similar to FIG. 3 but showing the lockbar overcenter from the position of FIG. 4 to prevent belt rewinding rotation of the reel.

DESCRIPTION OF THE PREFERRED EMBODIMENT

Referring to FIGS. 1 and 2 of the drawings, the vehicle occupant restraint belt retractor includes a stamped metal retractor housing generally designated 12. The housing 12 includes a pair of spaced apart side walls 14 and 16.

Referring to FIG. 1, it is seen that the restraint belt retractor includes a pair of side-by-side mounted belt reels 18, for respectively winding restraint belts 20 associated with the vehicle passenger seat and the driver seat. The reels 18 and the inertia locking mechanism therefor are similarly constructed and accordingly have their respective component parts designated by identical reference numerals.

As best seen in FIG. 2, the belt reel 18 is rotatably mounted between the side walls 14 and 16 by a reel shaft 22 and has spaced apart ratchet plates 24 and 26 having circumferentially spaced teeth 28. The teeth 28 have circumferentially spaced tooth surfaces 30 which face in the belt unwinding direction of reel rotation and tooth faces 32 facing in the belt winding direction. The restraint belt 20 is attached to the reel shaft 22 between the ratchet plates 24 and 26 and extends outwardly from the retractor for positioning across the seated occupant to provide a restraining function in the conventional manner.

Referring to FIG. 2, it is seen that the end of the reel shaft 22 extends outwardly through the adjacent side wall 16 and has a slot 38 which receives the inner end 40 of a spiral spring 42. The outer end of the spiral spring, not shown, is suitably fixed to a spring cover 44 so that the reel 18 is normally biased in the belt winding direction to store the belt 20 on the reel and pull the belt taut against the seated occupant.

A pendulum support 48 extends between the side walls 14 and 16 and supports a pendulum assembly 50 comprised of a cap 52, a stem 54 and a weight 56. The pendulum assembly 50 normally hangs in the vertical depending position of FIG. 2 but swings to an inclined position when a predetermined level of the vehicle deceleration is experienced.

As best seen in FIGS. 1 and 2, a lockbar 60 has a locking face 61 adapted for engagement with the teeth 28 of ratchet plates 24 and 26. Pivot shafts 62 and 64 are attached to the ends of the lockbar 60 and extend through curvilinear slots 66 in the side walls 14 and 16. The curvilinear slots 66 are arcuate about a pivot plate 68 which is pivotally journaled in aligned triangle shaped apertures 70 of the side walls 14 and 16.

A pair of support links 72 and 74 are juxtaposed with the side walls 14 and 16 and are welded or otherwise suitably fastened to the pivot plate 68 for rotation therewith. The support links 72 and 74 have aligned apertures which pivotally receive lockbar pivot shafts 62 and 64 so that the lockbar 60 is pivotally movable relative the support links 72 and 74. A coil tension spring 76 acts between the lockbar 60 and arm 77 attached to the pivot plate 68 to urge the lockbar 60 to the normal FIG. 1 position spaced away from the ratchet plates 24 and 26.

Referring again to FIGS. 1 and 2, it is seen that an actuator plate 78 connects the pendulum cap 52 with the lockbar 60 of both reels 18. As best seen in FIG. 2, the actuator plate 78 overlies the pendulum cap 52 and has a leg portion 80 which extends through an aperture of the side wall 14 to journal the actuator plate 78 for upward pivotal movement from the position of FIG. 1 and FIG. 2. As seen in FIG. 1, the actuator plate 78 has downturned legs 84 which seat upon the pendulum support 48 to establish a normal position of the actuator plate 78 in which the actuator plate 78 supports the lockbar 60 in the normal position of FIG. 1.

As best seen in FIGS. 1 and 4, an operator actuable mechanism is provided by which the lockbar 60 and the support links 72 and 74 may be moved away from engagement with the ratchet plates 24 and 26. As best seen in FIG. 4, a release arm 88 is connected to the end of each of the pivot plates 68 adjacent the side wall 14. The ends of the release arms 88 are joined together and connected to a clevis 92 by a pivot pin 90. An operating rod 94 is connected with the clevis 92 and connected with an operating handle 96 by a pivot pin 98. The operating handle 96 is mounted atop the retractor by a pivot pin 100 and has a hand grip 102. The normal position of the operating handle 96 is shown in FIG. 2 and is effective to establish the operating rod 94, release arms 88, pivot plates 68, and support links 72 and 74 in the normal positions of FIG. 1. The operating handle 96 may be raised to the phantom line indicated position of FIG. 2 via occupant actuation of the hand grip 102 as will be discussed hereinafter.

OPERATION

Referring to FIG. 1, it is seen that the lockbar 60 is normally poised in spaced relation from the ratchet plates 24 and 26 to permit free belt winding and unwinding. A predetermined level of vehicle deceleration causes the pendulum 50 to tilt and thereby pivot the actuator plate 78 to simultaneously pivot the lockbars 60 from the normal FIG. 1 position to the position of FIG. 3 engaging the unwinding facing tooth surfaces 30 of the ratchet plates 24 and 26. As seen in FIG. 3, the axes of the lockbar pivot shafts 62 and 64 are overcenter with respect to a line drawn between the lockbar locking face 61 and the axis of the support link pivot plate 68. Accordingly, the force imposed on the lockbar 60 during imposition of occupant restraining loads upon the belt 20 will urge the lockbar pivot shafts 62 and 64 into engagement with the upper ends of the curvilinear housing slots 66.

Upon termination of the vehicle deceleration condition, the pendulum 50 returns from the tilted position to the normal position of FIG. 1. Assuming that there is no occupant restraining load on the belt 20, the lockbar 60 will return to the position of FIG. 1. However, if the occupant weight remains on the belt 20, the locking interengagement between the lockbar 60 and the unwinding facing tooth surfaces 30 will retain the lockbar 60 in the locking position whether or not pendulum 50 may have returned to the normal vertical position of FIG. 1. Furthermore, the vehicle may come to rest at an unnatural attitude in which the force of gravity will tilt the pendulum 50 and cause the lockbar 60 to be engaged or remain in engagement with the tooth surfaces 30 even though there may be no occupant restraining load acting on the belt 20.

Referring to FIG. 4, it is seen that the operating handle 96 may be pivoted by operator actuation of the hand grip 102 in order to effect disengagement of the lockbar 60 to permit belt unwinding. More particularly, the pivoting of the operating handle 96 by lifting the hand grip 102 depresses the operating rod 94 and the release arms 88 to pivot the support links 72 and 74 about the pivot plates 68. The concomitant pivotal movement of the lockbar pivot shafts 62 and 64 away from the ratchet plates allows belt unwinding rotation of the ratchet plates and moves the lockbar 60 overcenter through the intermediate position of FIG. 4 to the position of FIG. 5. Accordingly, the lockbar 60 is established for engagement with the winding facing tooth surfaces 32 upon initiation of belt rewinding rotation of the reel 18. Accordingly, the lockbar 60 will prevent rewinding rotation of the belt reel 18 so that the belt will be held at an extended condition to facilitate occupant egress from the vehicle.

The various retractor components are returned to their respective normal FIG. 1 positions by again actuating the operating handle 96 so that the lockbar 60 moves away from the ratchet plates and returns overcenter under the bias of the coil tension spring 76 to reestablish the normal position of FIG. 1.

Thus, it is seen that the invention provides a new and improved manually operable mechanism by which the lockbar may be disengaged from locking engagement with the reel and moved overcenter to engage oppositely facing ratchet teeth on the reel to facilitate occupant egress by preventing belt rewinding by the retractor reel.

The embodiments of the invention in which an exclusive property or privilege is claimed are defined as follows:

1. A seat belt retractor comprising: a housing, a belt reel journaled on the housing for belt winding and unwinding rotation about an axis of reel rotation, a ratchet plate carried by the reel and having teeth facing in both the belt winding and unwinding directions, a lockbar pivotal between a disengaged position allowing both belt winding and unwinding rotation and first and second ratchet engaging positions overcenter from one another with respect to the axis of reel rotation for engagement respectively with the unwinding facing and winding facing ratchet teeth, support means normally supporting the lockbar at a position in locking proximity with the ratchet plate for selective pivotal movement from the disengaged position into engagement with the unwinding facing teeth to lock the reel against belt unwinding, and means actuable to permit limited reciprocal movement of the support means away from the ratchet plate to permit belt unwinding irrespective of engagement with the unwinding facing teeth and to pivot the lockbar overcenter with respect to the axis of reel rotation to establish the lockbar for subsequent engagement with the belt winding facing teeth to prevent belt rewinding reel rotation.

2. A seat belt retractor comprising: a housing, a belt reel journaled on the housing for belt winding and unwinding rotation about an axis of reel rotation, a ratchet plate carried by the reel and having teeth facing in both the belt winding and unwinding directions, a support link, a lockbar, first pivot means mounting the lockbar on the support link for movement between a position of disengagement relative the ratchet plate to allow both belt winding and unwinding rotation and first and second ratchet engaging positions overcenter from one another with respect to the axis of reel rotation for engagement respectively with the unwinding facing and winding facing ratchet teeth, second pivot means mounting the support link on the frame to permit pivotal movement of the support link relative the ratchet plate, means acting between the support link and housing to establish the support link in normal position establishing the lockbar in proximity with the ratchet plate, means for selectively pivoting the lockbar from the disengaged position to the first ratchet engaging position engaging the unwinding facing teeth to prevent belt unwinding reel rotation, and operator actuable means actuable to induce pivotal movement of the support link and first pivot means away from the ratchet plate to permit belt unwinding reel rotation and concomitant pivotal movement of the lockbar overcenter to the second ratchet engaging position to prevent subsequent belt winding reel rotation.

3. A seat belt retractor comprising a housing, a belt reel journaled on the housing for belt winding and unwinding rotation about an axis of reel rotation, a first set of ratchet teeth on the reel facing in the belt unwinding direction, a second set of ratchet teeth on the reel facing the belt winding direction, a lockbar adapted for selective alternate engagement with the first and second sets of ratchet teeth, means normally establishing the lockbar for engagement with only the first set of ratchet teeth facing in the unwinding direction and adapted to selectively effect such engagement so that the belt is locked against belt unwinding, means selectively operable to reverse the lockbar for engagement with only the second set of ratchet teeth facing in the belt winding direction so that the reel is free to rotate in the belt unwinding direction but prevented from rotating in the belt winding direction, and means adapted to restore the lockbar to the normal condition for subsequent selective engagement with the first set of teeth facing the belt unwinding direction.

* * * * *